May 26, 1931.  W. L. CLARK  1,807,236

FASTENING DEVICE

Filed April 27, 1928

Inventor
Wycliffe L. Clark
By Clarence H. Walker
His Attorney

Patented May 26, 1931

1,807,236

UNITED STATES PATENT OFFICE

WYCLIFFE L. CLARK, OF JAMESTOWN, NEW YORK

FASTENING DEVICE

Application filed April 27, 1928. Serial No. 273,229.

This invention relates to an improvement in a fastening device and more particularly to one employing hook and eye members.

In its preferred embodiment this invention has to do with a fastening device secured to the wall of a given receptacle and adapted through its hook shaped member to reach out, engage an eye member located upon the cover, drawing said cover down upon the receptacle and retaining it in this position until the device is moved into its open position whereby the cover may be freely raised.

It is well known that many kinds of fastening devices have been and are now on the market, but it is believed that none of these include the advantageous features of applicant's device, namely, that of being capable of reaching out to engage and draw down into closed position a given cover or when in its closed position being practically incapable of inadvertent opening. Applicant does not believe that prior to his invention a fastening device has been produced which, by means of an eccentrically mounted hook member, would be capable of reaching out a distance of an inch or more to engage and draw down the cover, to its closed position.

The principal object of this invention is to provide a fastening device comprised of few working parts and capable of reaching out to draw down and hold fast a cover upon a receptacle.

Another object of this invention is to provide a device of this class which, when operated to secure a cover upon a receptacle, will lock itself against inadvertent opening due to any mishandling of the receptacle.

A further object of this invention is to provide a device of this class which may be used to secure covers upon almost any kind of receptacle to be fitted with a seal whereby any and all unofficial tampering with the receptacle is apparent.

Other objects and advantages of this invention will appear from a consideration of the following specification taken in connection with the accompanying drawings, and in which Fig. 1 is a perspective view of a receptacle provided with a set of three fastening devices constructed in accordance with this invention;

Figure 3:
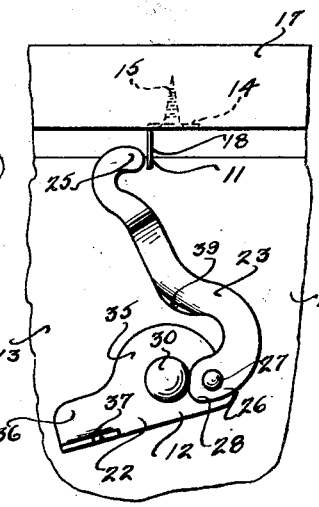
Fig. 3 is a view taken in the same plane with that of Fig. 2 and illustrates the positions taken by the various elements when the device has been moved from closed to open position.

Referring to the drawings and more particularly to Fig. 3, this device is generally indicated by the reference numeral 10 and comprises two parts, a fixed eye plate 11 and operative member 12. The plate 11 comprises a flat portion 14 secured by screws 15 to the cover 17 of the receptacle 13 and has depending at right angles to and near the front end thereof a flange 18. The flange 18 is provided with a suitable opening 19 therethrough. The portion 14 is secured to the cover 17 in a manner such that the screws 15 are located within the receptacle and are inaccessible when the cover is closed.

The member 12 comprises elements 22 and 23. The element 23 constitutes the engaging part of this member and is therefore provided at one end with a hook shaped portion 25. The other end 26 of the element 23 is pivotally mounted upon the element 22 by means of the pin 27 and is provided with a slightly extending shoulder 28, the use of which will later be described.

The element 22 is pivotally mounted upon the wall of the receptacle 13 by means of a bolt 30 which engages an opening 31 provided in said element and an opening 32 in the wall of the receptacle, said bolt being secured by a nut 33. The bolt 30 is formed with a smooth head in order that the fastening device may not be removed from the receptacle 13 when in engagement with the cover 17 without operating said device to move it into its open position. The element 22 comprises a main portion 35 and an actuating finger 36, said finger being provided with a right angle flange 37 by means of which the device is operated from one position to the other.

Figure 1:
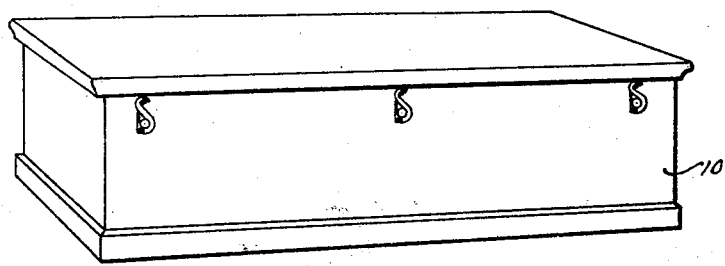
Figure 2:
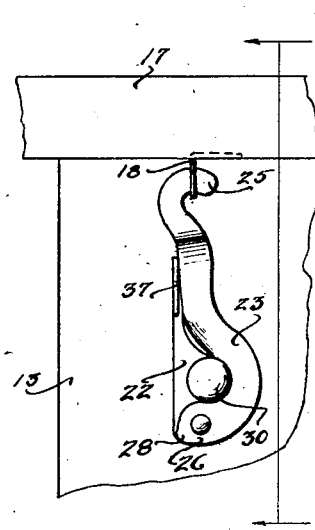
Fig. 2 is an enlarged view of one of the fastening devices shown in Fig. 1 and illustrates the relative location of the various elements when the device is in its closed position.

Attention is directed to the fact that the pivot about which the element 22 is adapted to swing does not form the pivoting means for the element 23. The element 23, as shown in the drawings, is mounted upon one extreme end of the element 22 by means of the pin 27. Since the element 23 is eccentrically mounted upon the element 22 moving said element will impart to the element 23 an upward or downward motion. Further attention is called to the fact that when the device is in its closed position, as shown in Fig. 2, the pin 27 will be in the same vertical plane as the eye plate 11 and the bolt 30, positioning the element 22 will be slightly offset. By means of this construction it is possible to move the device into its closed position and it will remain thus regardless of any jolting or jarring the receptacle may be subjected to and cannot be opened without first moving the element 22.

Forming a part of the element 23 is a slightly curved shoulder 39. As the element 23 is moved toward the element 22 the shoulder 39 comes in contact with the edge of the element 22 riding over it thus insuring free movement of the elements with relation to each other.

Figure 6:
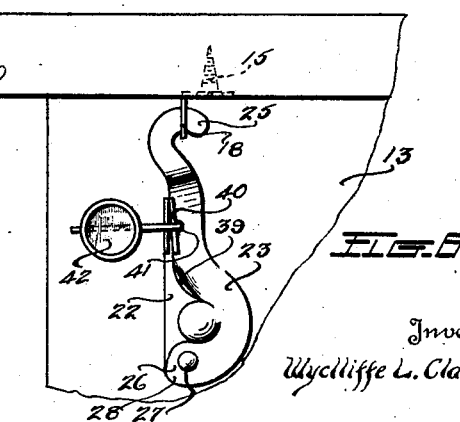
Fig. 6 illustrates a slight modification of this invention whereby the device when in closed position may be secured by a seal.

In Fig. 6 a front view of a construction similar to that in Fig. 2 is shown with the exception that a flange 40 is provided upon the element 23 substantially in line with the flange 37 of element 22 when said elements are in their closed position. When the plate 40 is provided on the element 23, holes 41 are drilled through both plates 37 and 40. By means of this construction it is possible to close a receptacle, fasten it in its closed position and secure the fastening device by a seal 42 having wire which passes through the opening 41 of both elements, thus undesired tampering with valuable or insured goods that may be contained within the receptacle is prevented.

Figure 4:
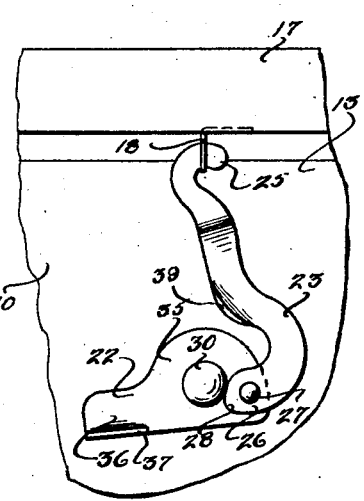
Fig. 4 is a view taken in the same plane with that of Fig. 3 and illustrates the manner by which the hook element is moved out to engage the cover of a receptacle preparatory to drawing down and securing said cover in its closed position.
Figure 5:
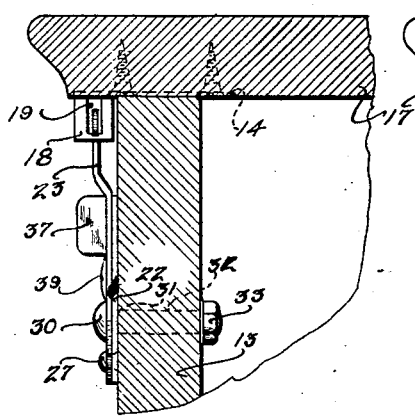
Fig. 5 is a sectional view taken on the line 5—5 of Fig. 2.

When it is desired to install a fastening device constructed in accordance with this invention, it is first necessary to locate and secure to the cover 17 the eye plate 11 in such a way that the flange 18 thereof will extend beyond the front wall of the receptacle when the cover is in its closed position. Below and slightly off center to the vertical line of the eye plate 11, the operative member 12 is located, being secured to the wall of the receptacle by the bolt 30. Because of the cam action obtainable, due to the eccentric mounting of the element 23 upon the element 22, the element 23, when element 22 is reciprocated, will not only have an up and down motion but a circular motion as well. Inasmuch as this fastening device is adapted to reach out to engage and draw down a cover into engagement with the receptacle, the upward limit of the movement must be known. This is found to be substantially equal to the vertical distance between the centers of the pin 27 and bolt 30. When the elements of the member 12 are moved to their open or inoperative position, as shown in Fig. 3, it will be noticed that the hook portion 25, while not in engagement with the eye plate 11 is in line with the opening 19 thereof and that upon further movement of the element 22, said hook will engage the plate 11 moving into the position shown in Fig. 4. In Fig. 4 the device is shown in engagement with the cover when it is not in close engagement with the receptacle. This condition might obtain if devices of this character formed a part of the closing means of a trunk or other similar receptacle, and in order to draw down the cover into close engagement it is only necessary to move the element 22 from the position in this figure to that shown in Fig. 2, and the cover will closely engage the walls of the receptacle. As the finger 26, of the element 22, is moved upwardly through an arc about the bolt 30, the lower end of the element 23 will travel downwardly through an arc of a lesser radius. As the element 23 is drawn downward the hook portion 25 draws with it the cover 17 until the member 12 has reached its closed position with the two elements thereof in close engagement with each other.

Although the element 23 is adapted to be firmly secured to the element 22 by means of the pin 27, it is quite probable that through continuous use the pin will wear and the elements become somewhat loosely joined. In order to overcome a too free movement between the elements 22 and 23, the shoulder 28, on the element 23, is provided. When the device is moved from its closed to its open position, the slight upward spring of the cover 17 will, through the plate 11, draw the hook portion 25 upward without releasing it from engagement with the plate 11. The element 22 could then be freely moved without disengaging the hook portion 25 were it not for the shoulder 28 provided at the end of the element 23. When the element 22 is moved downwardly toward its inoperative position, and has reached the point shown in Fig. 4 of the drawing, the shoulder 28 will have begun to bear slightly against the head of the bolt 30. As the element 22 continues its downward movement, the shoulder 28 binds against the bolt 30 sufficiently to form a stop to any further movement between the two elements and from this point on the elements move as one, by reason of which the hook portion 25 is forced out of engagement with the eye plate 11 and into a position substantially as shown in Fig. 3 of the drawing.

It is obvious that the limit of distance to which the hook portion 25 can reach out to engage the eye plate is governed by the distance between the centers of the pin 27 and bolt 30 and if it is desired to provide this fastening device with a greater reach the element 22 may be lengthened and the pin 27 moved to a position more remote from the bolt 30.

While only one modification of this invention has been shown and described, applicant does not intend to be limited thereto, since it is obvious that other modifications and adaptations may be made without departing from the spirit and scope of this invention as set forth in the following claim.

Having thus set forth my invention what I claim as new and for which I desire protection by Letters Patent is:

In a fastening device, actuating and hook elements, means pivotally mounting said actuating element through the body portion thereof, a flanged finger terminating one end of said actuating element, means pivotally supporting said hook element upon said actuating element adjacent said actuating element supporting means, a shoulder formed adjacent the pivotal end of said hook element and adapted to engage the pivotal means of said actuating element to prevent any relative movement between said elements and an outwardly extending flange formed midway of said hook element adapted to abut the flange of said actuating element when said fastening device is closed whereby a lock or seal may engage said flanges and prevent the elements from being separated to open the device.

In testimony whereof I have affixed my signature.

WYCLIFFE L. CLARK.